(12) United States Patent
Dapp (10) Patent No.: US 7,213,265 B2
(45) Date of Patent: May 1, 2007

(54) REAL TIME ACTIVE NETWORK COMPARTMENTALIZATION

(75) Inventor: Michael C. Dapp, Endwell, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 869 days.

(21) Appl. No.: 09/973,776

(22) Filed: Oct. 11, 2001

(65) Prior Publication Data

US 2002/0059528 A1 May 16, 2002

Related U.S. Application Data

(60) Provisional application No. 60/248,906, filed on Nov. 15, 2000.

(51) Int. Cl.
*G06F 11/34* (2006.01)
*G06F 15/173* (2006.01)
*H04L 12/26* (2006.01)
*G08B 23/00* (2006.01)

(52) U.S. Cl. .................. 726/23; 370/217; 709/238; 714/4

(58) Field of Classification Search ........ 709/223–225, 709/238; 713/200, 201; 714/4; 726/22–25; 370/217
See application file for complete search history.

(56) References Cited

U.S. PATENT DOCUMENTS

| | | | |
|---|---|---|---|
| 4,279,034 A | 7/1981 | Baxter | 714/4 |
| 4,527,270 A | 7/1985 | Sweeton | 714/47 |
| 4,556,972 A | 12/1985 | Chan et al. | |
| 4,622,546 A | 11/1986 | Sfarti et al. | |
| 4,879,716 A | 11/1989 | McNally et al. | 710/316 |
| 5,003,531 A | 3/1991 | Farinholt et al. | 370/223 |
| 5,027,342 A | 6/1991 | Boulton et al. | 370/225 |

(Continued)

FOREIGN PATENT DOCUMENTS

CA 2307529 A1 9/2001

(Continued)

OTHER PUBLICATIONS

A.B. Kulkarni, S.F. Bush and S.C. Evans "Detecting Distributed Denial-of- Service Attacks Using Kolmogorov Complexes Metrics" dated Dec. 2001.

(Continued)

*Primary Examiner*—Gilberto Barrón, Jr.
*Assistant Examiner*—Matthew Heneghan
(74) *Attorney, Agent, or Firm*—Miles & Stockbridge PC; James T. Carmichael (57) ABSTRACT

Security policy manager devices are leveraged by manager objects to use highly secure user transparent communications to provide detection of questionable activities at every node, automatic collection of information related to any potential attack, isolation of the offending object with arbitrary flexibility of response (e.g. flexibly determining the level of certainty of an attack for initiation of a response in accordance with the number of nodes to be partitioned that is determined by the collected data concerning the potential attack), changing trust relationships between security domains, limiting the attack and launching offensive information warfare capabilities (e.g. outbound from the compromised node while limiting or eliminating inbound communications) in log time and simultaneously and/or concurrently in different but possibly overlapping sections or segments of a digital network of arbitrary configuration.

19 Claims, 4 Drawing Sheets

U.S. PATENT DOCUMENTS

| | | | |
|---|---|---|---|
| 5,193,192 A | 3/1993 | Seberger | |
| 5,214,778 A | 5/1993 | Glider et al. | 714/2 |
| 5,247,664 A | 9/1993 | Thompson et al. | 707/10 |
| 5,280,577 A | 1/1994 | Trevett et al. | |
| 5,319,776 A | 6/1994 | Hile et al. | |
| 5,379,289 A | 1/1995 | DeSouza et al. | |
| 5,414,833 A | 5/1995 | Hershey et al. | |
| 5,511,213 A | 4/1996 | Correa | |
| 5,513,345 A | 4/1996 | Sato et al. | 714/4 |
| 5,600,784 A | 2/1997 | Bissett et al. | |
| 5,606,668 A | 2/1997 | Shwed | 713/201 |
| 5,621,889 A | 4/1997 | Lermuzeaux et al. | |
| 5,649,215 A | 7/1997 | Itoh | |
| 5,655,068 A | 8/1997 | Opoczynski | 714/4 |
| 5,666,479 A | 9/1997 | Kashimoto et al. | |
| 5,684,957 A | 11/1997 | Kondo et al. | |
| 5,696,486 A | 12/1997 | Poliquin et al. | 340/506 |
| 5,737,526 A | 4/1998 | Periasamy et al. | |
| 5,742,771 A | 4/1998 | Fontaine | 709/225 |
| 5,798,706 A | 8/1998 | Kraemer et al. | |
| 5,805,801 A | 9/1998 | Holloway et al. | 713/201 |
| 5,815,647 A | 9/1998 | Buckland et al. | |
| 5,832,227 A | 11/1998 | Anderson et al. | 709/224 |
| 5,848,410 A | 12/1998 | Walls et al. | |
| 5,850,515 A | 12/1998 | Lo et al. | |
| 5,905,859 A | 5/1999 | Holloway et al. | 713/201 |
| 5,919,257 A | 7/1999 | Trostle | |
| 5,919,258 A | 7/1999 | Kayashima et al. | |
| 5,920,698 A | 7/1999 | Ben-Michael et al. | 709/224 |
| 5,922,049 A | 7/1999 | Radia et al. | |
| 5,958,015 A | 9/1999 | Dascalu | |
| 5,969,632 A | 10/1999 | Diamant et al. | 340/5.3 |
| 5,982,890 A | 11/1999 | Akatsu | |
| 5,991,881 A | 11/1999 | Conklin et al. | 713/201 |
| 5,995,963 A | 11/1999 | Nanba et al. | |
| 6,000,045 A | 12/1999 | Lewis | |
| 6,006,019 A | 12/1999 | Takei | 709/224 |
| 6,021,510 A | 2/2000 | Nachenberg | |
| 6,083,276 A | 7/2000 | Davidson et al. | |
| 6,094,731 A | 7/2000 | Waldin et al. | |
| 6,119,236 A | 9/2000 | Shipley | |
| 6,151,624 A | 11/2000 | Teare et al. | |
| 6,167,448 A | 12/2000 | Hemphill et al. | |
| 6,173,333 B1 | 1/2001 | Jolitz et al. | |
| 6,182,029 B1 | 1/2001 | Friedman | |
| 6,233,704 B1 | 5/2001 | Scott et al. | |
| 6,279,113 B1 | 8/2001 | Validya | |
| 6,282,546 B1 | 8/2001 | Gleichauf et al. | |
| 6,295,276 B1 | 9/2001 | Datta et al. | |
| 6,301,668 B1 | 10/2001 | Gleichauf et al. | |
| 6,304,973 B1 | 10/2001 | Williams | |
| 6,321,338 B1 * | 11/2001 | Porras et al. | 713/201 |
| 6,363,489 B1 | 3/2002 | Comay et al. | |
| 6,366,934 B1 | 4/2002 | Cheng et al. | |
| 6,370,648 B1 | 4/2002 | Diep | |
| 6,374,207 B1 | 4/2002 | Li et al. | |
| 6,393,386 B1 | 5/2002 | Zager et al. | |
| 6,405,318 B1 | 6/2002 | Rowland | |
| 6,408,311 B1 | 6/2002 | Baisley et al. | |
| 6,418,446 B1 | 7/2002 | Lection et al. | |
| 6,421,656 B1 | 7/2002 | Cheng et al. | |
| 6,446,110 B1 | 9/2002 | Lection et al. | |
| 6,684,335 B1 * | 1/2004 | Epstein et al. | 726/23 |
| 6,697,950 B1 | 2/2004 | Ko | |
| 6,792,546 B1 | 9/2004 | Shanklin et al. | |
| 6,862,588 B2 | 3/2005 | Beged-Dov et al. | |
| 2001/0056504 A1 | 12/2001 | Kuznetsov | |
| 2002/0010715 A1 | 1/2002 | Chinn et al. | |
| 2002/0013710 A1 | 1/2002 | Shimakawa | |
| 2002/0035619 A1 | 3/2002 | Dougherty et al. | |
| 2002/0038320 A1 | 3/2002 | Brook | |
| 2002/0059528 A1 | 5/2002 | Dapp | |
| 2002/0066035 A1 | 5/2002 | Dapp | |
| 2002/0069318 A1 | 6/2002 | Chow et al. | |
| 2002/0073091 A1 | 6/2002 | Jain et al. | |
| 2002/0073119 A1 | 6/2002 | Richard | |
| 2002/0082886 A1 | 6/2002 | Manganaris et al. | |
| 2002/0083343 A1 | 6/2002 | Crosbie et al. | |
| 2002/0087882 A1 | 7/2002 | Schneier et al. | |
| 2002/0091999 A1 | 7/2002 | Guinart | |
| 2002/0099710 A1 | 7/2002 | Papierniak | |
| 2002/0099715 A1 | 7/2002 | Jahnke et al. | |
| 2002/0099734 A1 | 7/2002 | Yassin et al. | |
| 2002/0103829 A1 | 8/2002 | Manning et al. | |
| 2002/0108059 A1 | 8/2002 | Canion et al. | |
| 2002/0111963 A1 | 8/2002 | Gebert et al. | |
| 2002/0111965 A1 | 8/2002 | Kutter | |
| 2002/0112224 A1 | 8/2002 | Cox | |
| 2002/0116550 A1 | 8/2002 | Hansen | |
| 2002/0116585 A1 | 8/2002 | Scherr | |
| 2002/0116644 A1 | 8/2002 | Richard | |
| 2002/0120697 A1 | 8/2002 | Generous et al. | |
| 2002/0122054 A1 | 9/2002 | Hind et al. | |
| 2002/0133484 A1 | 9/2002 | Chau et al. | |
| 2002/0143819 A1 | 10/2002 | Han et al. | |
| 2002/0152244 A1 | 10/2002 | Dean et al. | |
| 2002/0156772 A1 | 10/2002 | Chau et al. | |
| 2002/0165872 A1 | 11/2002 | Meltzer et al. | |
| 2003/0041302 A1 | 2/2003 | McDonald | |
| 2003/0229846 A1 | 12/2003 | Sethi et al. | |
| 2004/0025118 A1 | 2/2004 | Renner | |
| 2004/0073870 A1 | 4/2004 | Fuh et al. | |
| 2004/0083221 A1 | 4/2004 | Dapp et al. | |
| 2004/0083387 A1 | 4/2004 | Dapp et al. | |
| 2004/0083466 A1 | 4/2004 | Dapp et al. | |
| 2004/0172234 A1 | 9/2004 | Dapp et al. | |
| 2004/0194016 A1 | 9/2004 | Liggitt | |
| 2005/0039124 A1 | 2/2005 | Chu et al. | |
| 2005/0177543 A1 | 8/2005 | Chen et al. | |

FOREIGN PATENT DOCUMENTS

| | | |
|---|---|---|
| JP | 2000-112860 | 4/2000 |
| JP | 2000-341324 A | 12/2000 |
| JP | 2002-526830 | 8/2002 |
| JP | 2003-521779 | 7/2003 |
| WO | WO 02/11399 A1 | 2/2002 |
| WO | WO 02/095543 A2 | 11/2002 |

OTHER PUBLICATIONS

M. Neumann, "Encryption Black Box (SiNic)", *ESNET Steering Committee Meeting*, Sep. 11-13, 2001.

E. Zadok, "Stackable File Systems as a Security Tool", *Technical Report* CUCS-036-99, Columbia University Computer Science Department, Dec. 1999, pp. 1-19.

Fraser et al., "Hardening COTS Software with Generic Software Wrappers", DARPA Information Survivability Conference and Exposition, 2000, pp. 323-337.

Pal et al., "Open Implementation Toolkit for Building Survivable Applications", DARPA Information Survivability Conference and Exposition, 2000, pp. 197-210.

Kent, RFC 2401, "Security Architecture for the Internet Protocol," 1998.

Lunteren et al. "XML Accelerator Engine", 2004.

Sakharov, "Finite State Machine Specification and Generation in Java", 2000, http://sakharov.net/fsm.html.

Andrivet et al., "A Simple XML Parser", Jul. 1999, C/C++ Users Journal, R&D Publications, Lawrence, KS, US, pp. 22,24,26-28,30,32, XP008015172, ISSN: 1075-2838.

Cooper, C., "Using Expat", Sep. 1, 1999, XP002177815.

A.B. Kulkarni; S.F. Bush and S.C. Evans "Detecting Distributed Denial-of-Service Attacks Using Kolmogorov Complexity Metrics" dated Dec. 2001.

S.C. Evans and S.F. Bush "Symbol Compression Ratio for String Compression and Estimation of Kolmogorov Complexity" dated Nov. 2001.

B. Trippe; "XML Hits the Big Time: Major Database Players get into XML"; Find articles.com; Sep. 2002; pp. 1-9.

Business Wire, Bellevue, Wash; "DataChannel Releases the Most Advanced XML Parser—XJParser—and Introduces xDev its XML Developers Program"; Find articles.com; Apr. 16, 1999, pp. 1-9.

InfoWorld: "Extensible Markup Language (XM). (Technology Information)"; Find articles.com; Jun. 1998; pp. 1-6.

T. Yager; "New Standards Orbit (XML) (Technology Information)"; Find articles.com; Jun. 2000; pp. 1-9.

Microsoft Corp., "XML: Enabling Next-Generation Web Applications"; Dytech Solutions; Apr. 1998; pp. 1-15.

Aho, A.V. et al., "Principles of Compiler Design", Principles of Compiler Design, Reading, Addison-Wesley Publishing Co., US., 1979, pp. 73-125, XP002140006, p. 88, line 4—p. 115, line 7; figures 3.5-3.22.

Bauer, F.L., "Compiler Construction—An Advanced Course", 1976, Springer-Verlag, Germany, XP002312623, pp. 42-55; pp. 85-108.

* cited by examiner

REAL TIME ACTIVE NETWORK COMPARTMENTALIZATION

CROSS-REFERENCE TO RELATED APPLICATIONS

This application claims priority of U.S. provisional Application Ser. No. 60/248,906, filed Nov. 15, 2000, and assigned to the assignee of the present application, as does concurrently filed related application Ser. No. 09/973,769 both of which are hereby fully incorporated by reference.

BACKGROUND OF THE INVENTION

1. Field of the Invention

The present invention generally relates to digital communications networks and, more particularly, to the development of the properties of high levels of security and fault tolerance by active attack detection and real time establishment of compartmented security domains to permit network functionality in the presence of denial of service and other attacks.

2. Description of the Prior Art

Numerous technical developments and economic forces have led to the widespread use of distributed data processing systems in which numerous data processors, each of which may be capable of functioning independently, are connected by a network in order to share both data and hardware and software resources. The connectivity of the system may be hard wired over a local or wide area network or may use links which are more or less accessible to the public, such as the Internet which utilizes many common carrier communication links which may be made available to a given processor through various hardware interfaces. When such technical capabilities such as the development of the TCP/IP protocol were being initially developed, however, flexibility of interconnectivity, scalability and ease and reliability of data exchange were of paramount importance and the importance of security measures was not fully appreciated and left to be implemented at individual processors or individual resources to prevent access from other connected processors.

Of course, a given processor may be effectively connected to more than one network at a time and thus a publicly accessible network can be used to access another network, potentially through a sequence of processors. On the other hand, limiting access of processors to only secure or unsecure networks reduces functionality of the processor to levels which may be unacceptable clue to the reduction of accessible resources. It is also in the versatile nature of data processors that any security feature that may be devised may also be defeated and protection of sensitive resources is entirely grounded in the difficulty of defeating the security measures utilized. Further, as alluded to above, restriction of access is usually provided only at individual processors or resources (e.g. applications) and not within the network, itself.

As the use of TCP/IP networking has grown, techniques for exploiting a lack of security have been discovered, developed, implemented and widely shared in the hacker community worldwide. This circumstance presents a fundamental threat to the global network infrastructure that must be ameliorated if security of any network or connected resource is to be achieved.

Accordingly, there are numerous reports of increasingly sophisticated intruder attacks on both military and commercial computer systems. Computer attacks may take the form of gaining access to sensitive data (to either learn its contents or to corrupt it) resident on individual systems or in the form of a so-called virus or worm to damage or destroy processors or resources in a largely indiscriminate manner.

Yet another form of attack which is of increasing concern is the "denial of service" (DOS) attack in which normal network functions are demanded at rates approaching or exceeding system capacity to respond, thereby denying service to other requestors or otherwise disrupting other communications or services such as overloading telephone or power distribution networks. It has also been reported by numerous studies that many such attacks, regardless of form, are initiated by persons having some level of legitimate authorized access to the system attacked or at least a connected system.

Networks are inherently susceptible to attack by exploitation of security weaknesses in network protocols and infrastructure components. In addition to unauthorized viewing and modification of data, alluded to above, security controls of the operating systems and applications installed on the network may be circumvented, network firewalls (used extensively at network boundaries) may be penetrated, network functions may be disrupted, sessions of authorized users (after they have been authenticated) can be stolen and routing functions of the network can be disrupted to misdirect network data. A concerted attack on military network infrastructure can compromise military operations or force network shutdown. Identification and authentication (I&A) capabilities provided by recently developed forms of identification certificates does not provide technical mechanisms to respond to attacks against network protocols.

Traditionally, a three layered approach has been taken in an attempt to provide protection of networks. The first layer is the extensive use of firewalls to control access to the network from outside the network. However, firewalls become geometrically more difficult to manage as the number and variety of authorized accesses increases. This difficulty is particularly evident in military networks which become particularly susceptible to penetration through exploitation of errors in configuration of their access control rule set.

However, firewalls are not fully effective since the manner in which TCP/IP manages packet fragmentation can be exploited for "punching through" the packet filtering system of firewalls. "Session Hijacking", although complex, can be automated to negate effective use of strong user authentication. Further, it is difficult to force all network access to be made only through the firewall. The availability of commercial modems that interface to digital PBX systems and the Remote Access Server included in Microsoft Windows (TM) software makes control of the use of dial-up connections to the network through firewalls impractical.

The second layer of protection is strong user authentication such as biometric systems and digital certificates. However, such systems are costly and generally implemented on only the most sensitive systems and can, nevertheless, be rendered ineffective by session hijacking attacks, alluded to above, because of the inability of TCP/IP to authenticate the source address packets, to close out "half-open" connections and to protect the session sequence numbers contained in the TCP header.

The third layer of protection is to maintain separate networks for each level of security classification or class of access authorization and to depend on personnel clearances. This approach is extremely costly, limits the functionality of each separate system, presents problems of maintaining data integrity and provides no protection from misuse or damage by persons having access to any given system. Further, it is generally desirable to be able to accommodate both mandatory access control (MAC) in which access is controlled based on classification of the information or resource and discretionary access control (DAC) which is based on a correlation of anticipated user function and the nature of data that may be needed to perform that function. It can be readily appreciated that MAC and DAC may each be complex and overlap with much increased complexity, greatly multiplying the number of separate systems which may be required among which data integrity must be maintained.

Detection of an attack before substantial damage is done is often difficult, particularly when the attack is of the denial of service type. Viruses, for example, cannot be detected before at least some of their basic characteristics (e.g. a filename by which they are executed) is known; by which time the virus may have been widely proliferated, causing some degree of damage to each computer it has reached. A denial of service attack is, by its nature, indistinguishable from other intended functions of the system except for the volume of transactions it presents and possible similarities of requested services necessitated by the volume of requests required for a successful attack.

In general, when an attack is detected, at least a major portion of network services must be disrupted in order to respond to the attack. Therefore, achieving a degree of certainty that an attack is in progress commensurate with the magnitude of necessary system disruption often unacceptably delays action and thus does not acceptably limit damage or prevent access to critical data or resources.

In summary, enhancement of security in digital networks is extremely challenging in view of the weaknesses in protocols which cannot readily be changed. Most approaches proposed to date are extremely costly and compromise system functionality and utility while being difficult to implement in complex environments that cannot readily be modified. Proposals for security enhancements to date have also not been easily scalable, potentially functional across multiple networks or globally, adequately sensitive to potential attacks, capable of accurately and quickly isolating a fault or an attack and allowing error recovery or able to actively protect against attacks by authorized users, the currently most frequent source of system attacks.

SUMMARY OF THE INVENTION

It is therefore an object of the present invention to provide fault and potential attack encapsulation in a fine-grained manner in a digital communications network.

It is another object of the invention to provide error and damage limitation and recovery in a rapid and automatic manner in a digital communications network to rapidly restore the full functionality thereof quickly and with minimal disruption.

It is a further object of the invention to provide a global active response to faults and potential attacks in substantially real time while maintaining substantially undiminished network capabilities.

In order to accomplish these and other objects of the invention, a method of operating a digital network having nodes which have a locally hierarchical relationship is provided comprising steps of detecting a condition at a node and communicating the condition to a trusted node locally higher in the hierarchical relationship, collecting information regarding the condition through nodes at the same or higher hierarchical level as said trusted node, and controlling a response at the node in response to the information.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
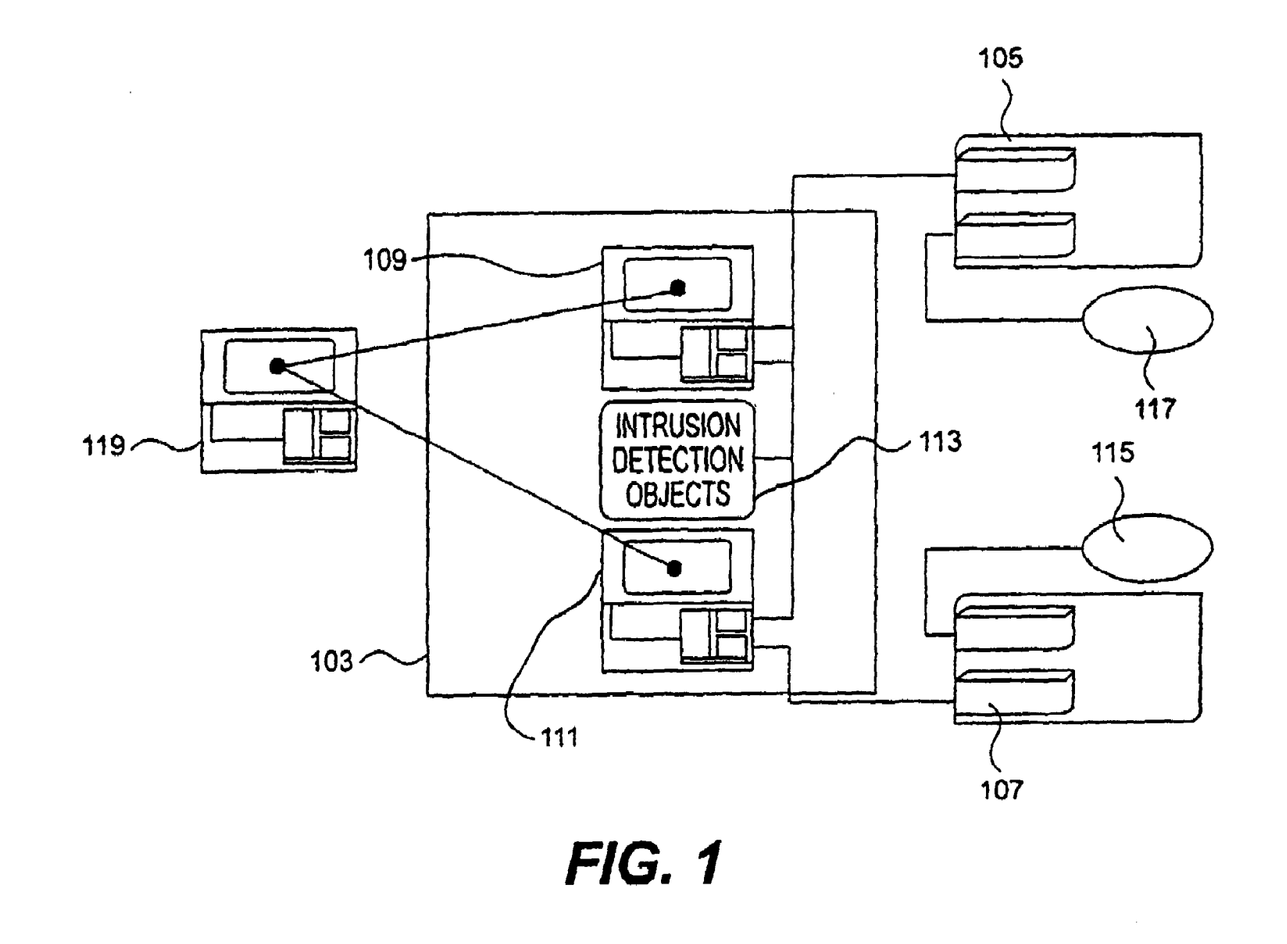
FIG. 1 is a schematic diagram of a basic element of the network in accordance with the invention and including a lock circuit including two routers providing communications from different networks.

Referring now to the drawings, and more particularly to FIG. 1, there is shown a basic network element 103 and associated network nodes in accordance with the invention. It should be understood that routers are well-understood network elements for controlling communications between nodes of a network although only a single router (but which may have an arbitrary number of ports) would normally be associated with a given node of the network. Use of a lock in combination with routers is also well-understood in the art. However, it should be understood that no portion of any Figure is admitted to be prior art in regard to the present invention.

As will become clear from the following discussion, the present invention provides a secure, fault-tolerant network than can implement an arbitrary security policy with arbitrarily fine granularity and continue to provide service in the presence of a variety of hardware failures and security penetration attacks. This is accomplished by developing a networking subsystem by inclusion of enhancements which accommodate existing elements of network architecture and software and integrate fault tolerant extensions of object oriented programming architecture, strong encryption strong authentication at the node and data packet level and real-time active responses to detection of faults and attacks with enhanced sensitivity.

It should also be appreciated that while the preferred form of the invention will be discussed in the context of well-known standard protocols and a preferred common object request broker architecture (CORBA, an architecture that, including extensions such have been made commercially available by the assignee of the present invention under the name "Hardpack" for developing a high degree of fault tolerance, such as repairing or replacing software objects from other nodes when needed, as is summarized in the above-incorporated U. S. provisional patent application, enables modules of software, known as "objects" to communicate with one another) and common management information protocol (CMIP, an open system interconnection (OSI) standard protocol used with common management information services (CMIS) standard protocol) other architectures and protocols may be used to embody the invention.

As will be discussed below, the basic principle of the invention is the use of a highly secure user transparent subsystem infrastructure which can detect failures and questionable activity and communicate, in a secure and encrypted form, the potential condition of a network node to adjacent nodes which can then isolate or encapsulate a potentially compromised node while rerouting normal network traffic to integrate the extended and fault tolerant CORBA architecture with strong encryption, enhanced intrusion detection and an effective security policy to support effective active responses to faults and potential attacks. This reporting supports fine-grained control of network access as well as logging of information concerning network activity and node status to limit damage, improve detection and facilitate recovery from a wide variety of failures and attacks.

As shown in FIG. 1, the overall function of the interface element 103 including two locking devices 109, 111 and two routers 105, 107 is to support communications with and between networks 115, 117 through routers 105, 107 and with network node 119 which may or may not also include a similar interface element. Thus, it can be appreciated that interface element 103 can control the connectivity of three network nodes. Further, it can be appreciated that locking devices 109, 111 communicate with each other to provide connectivity between networks 115, 117 as well as with processor 119. Thus, the interface element 103 can function as a lock to interrupt communications between networks, nodes or terminals at a particular network node.

Locking devices are generally implemented on separate cards (a preferred form of which is known as a VME card) which are connectable to other circuits through a rack or "motherboard" arrangement or the like. Therefore, it is convenient to provide additional security structure at a location electrically between the two locking devices (e.g. connected to a common bus). In accordance with the invention, this is preferably accomplished with a processor on a separate card (represented by 113 of FIG. 1) processing fault and intrusion detection objects as well as encryption and decryption algorithms for communication of data regarding potential faults and attacks to similar cards at other network nodes. Thus it is seen that the basic element of the invention can be mechanically assembled and integrated into a system in a simple and convenient manner while not affecting other parts of the network or normal functions thereof. Accordingly, implementation of the invention can be performed incrementally and scalably to any desired degree including global implementation.

Functionally, it should be appreciated that the processor arrangement 113 can implement any number of objects for fault or intrusion detection and which may be of any arbitrary design, including a number of algorithms which are commercially available for the purpose. Results of the execution of these objects can be communicated over normal network links to other nodes and used by manager objects to exercise any desired control over the locking devices, to implement any desired security policy (e.g. mandatory access control (MAC), Discretionary access control (DAC), and the like) and/or to log any desired information concerning the status or operations of any node through other managed objects at each node. More generally, managed objects include network interface managed objects, intrusion detection managed objects and network service managed objects.

All of these communications are preferably performed in a user transparent fashion at high bit rates and encrypted in accordance with any desired encryption algorithm (DES, DES-3 or Type 1 algorithms implemented in hardware for highest speed being preferred) which may also be altered and keys arbitrarily exchanged and altered by the same type of communications which are entirely transparent to all users and may be made arbitrarily difficult to intercept by any of a number of known techniques which will be evident to those skilled in the art. Further, each transmission or group of transmissions (for a given user) may be supplied with identification information (e.g. in the form of a stamp or the like) by processor 113, even if the user is not identified and any desired tracking or logging information may be transmitted to other nodes for error recovery and determination of the source of any detected potential attack as well as continuous monitoring and authentication of the source node for all communications, potentially to the data packet level.

These detection operations and communications may be conducted separately from normal user data communications traffic in substantially real time and communications performed at extremely high data rates potentially as great as or exceeding 10 Gbps since it is essentially only necessary for boards 113 at different network nodes to be compatible and communicate with each other and with complete independence from other user data communication processors connected to the network. High transmission bit rates and, preferably, transmission priority arrangements for such user transparent network infrastructure communications (e.g. preferentially communicated relative to user data communications) assist in assuring that network security control functions will be carried out even during denial of service (DOS) attacks. Accordingly, the processor card 113 is referred to as a security policy manager (SPM) card.

It should be appreciated that implementation of such capabilities in combination with routers which also support a high level of security (e.g. cards supporting audit, MAC, DAC, user identification and authentication security functions) enables active network response to security alerts and isolation of compromised nodes from uncompromised nodes in substantially real time (often referred to as log time since the actual time required is a fixed multiple of the logarithm of the number of the nodes secured and thus increases slowly as the number of nodes increases and the granularity of protection is made finer) as will be discussed in more detail below. Further details of the preferred implementation of this basic element of the invention are disclosed in greater detail in the above-incorporated, concurrently filed U.S. Patent Application.

Figure 2:
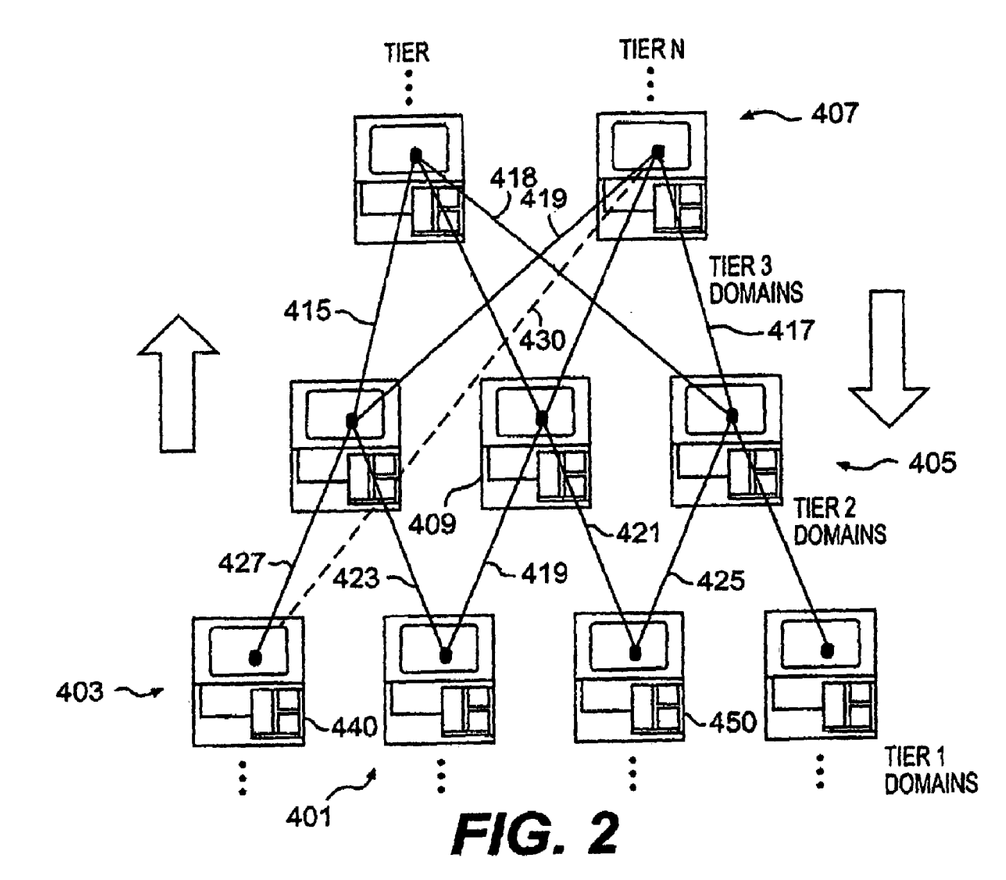
FIG. 2 is a schematic illustration of a redundant hierarchy of independently secured security domains in accordance with the invention, FIG. 3 schematically illustrates an exemplary preferred operation of the redundant hierarchy of FIG. 2.

Referring now to FIG. 2, a network 401 is shown hierarchically arranged in tiers 403, 405, 407 with communications paths (e.g. 415, 423) shown connecting respective adjacent tiers. While a hierarchy of tiers is preferred and illustration of communication links limited to those between respective adjacent tiers as a matter of clarity, it is only necessary to the successful practice of the invention that any given tier have more than one node or a communication path past that tier and a tier at a locally higher hierarchical level. Even these requirements are only necessary to the extent of providing an orderly correspondence between manager objects and managed objects; which correspondence could be accommodated in other ways that provide a locally hierarchically higher node for each node except for the highest tier. Other network configurations are also possible and may be desirable under particular circumstances or for particular applications.

For example, a communication link depicted by dashed line 430 could be used as a communication link through tier 405 with tier 407 above tier 403 or to place a node of tier 403 hierarchically above tier 405. Nevertheless, an organization containing communications links such as 430 may engender unjustified complexity although some advantages may accrue such as establishing further redundant communication paths and/or avoiding a top level of the hierarchy which might be an excessively attractive target for attack.

It should be noted that the network shown in FIG. 2 (without link 430) provides redundant communication links between all nodes of the network even though there are no links between nodes of the same tier, as is also preferred for practice of the invention. (In this regard, however, it should be recognized that the assignment of any given tier to any given node is arbitrary.) For example, node 440 can communicate with node 450 over communication links 427, 423, 419 and 421; 427, 415, 418 and 425; or 427, 419, 417 and 425. Other redundant paths would exist if the network were extended to more tiers and/or more nodes per tier.

Therefore, routers monitoring traffic on the network can assign any of a number of convenient paths between any two nodes of the network. Conventional network protocols, in fact, allow a plurality of different paths that may be of differing latency to be employed for a given message with the bit packets being reassembled in proper order after receipt by the intended destination node. The invention provides the additional functionality of eliminating and substituting paths for isolation of questionable or compromised nodes at the portal or gateway to each node to maintain substantially full network functionality while preventing proliferation of faults or damage from attacks as well as the attacks themselves.

The locally hierarchical architecture described above greatly enhances security throughout the network since a response to an attack on one node will be controlled by another node which should respond correctly unless that node is simultaneously under attack, as well (prior faults throughout the network having been previously encapsulated and isolated). In such a case, a manager object at yet another node at a locally higher hierarchical level would control the active response, and so on, while establishing a plurality of secure sessions and security domains (e.g. depicted by links 427, 415, 418, 425 of FIG. 2 between node 440 and node 450 as client and server and which may be defined by the user or automatically as an incident of routing or re-routing communications) over which control can be exercised through user transparent communications from a manager object at a node which remains trusted. A plurality of levels of trust can also be readily implemented for respective nodes and communicated throughout the network system or any desired portion thereof.

Figure 3:
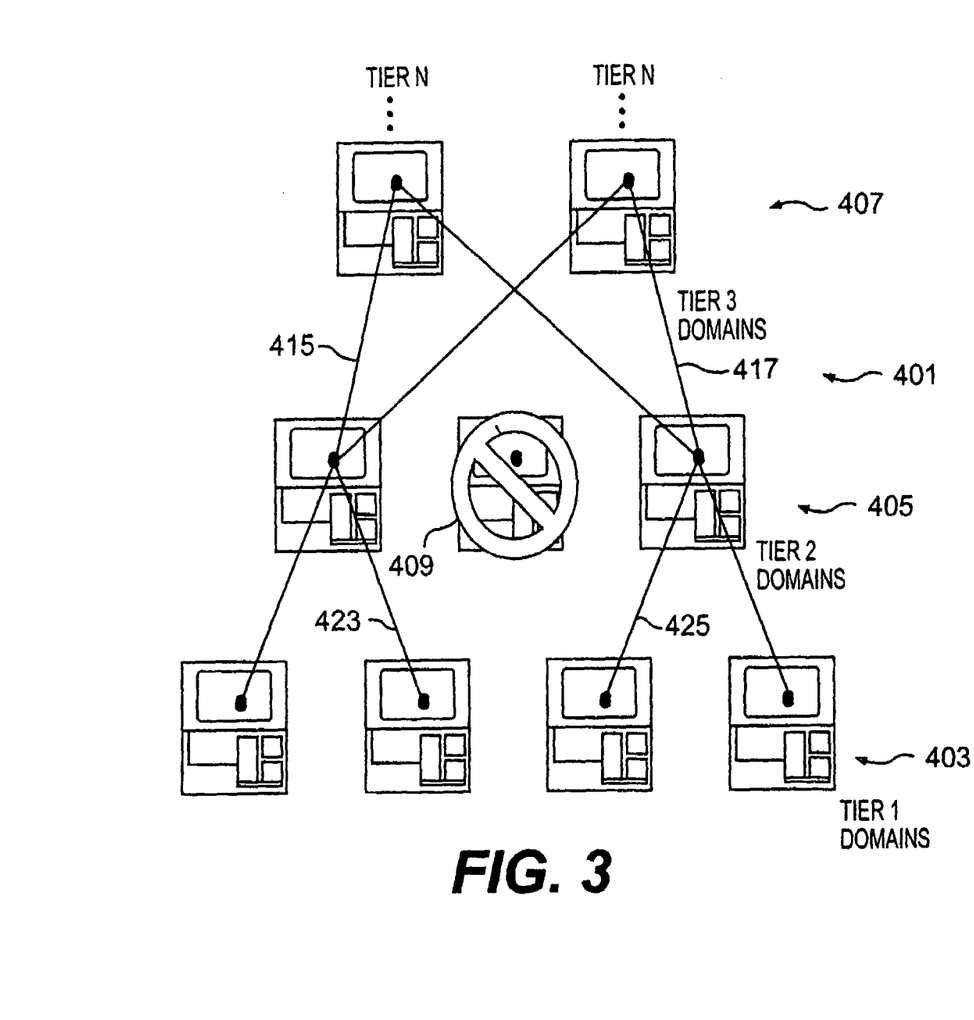

In the event of a security breach, the CMIP managers possess the ability (in the manager objects) to instruct the SPM device to enable and disable network ports to isolate network nodes or segments/sectors and to notify other trusted entities in the CMIP manager and managed object hierarchy of changes in trust for potentially contaminated or compromised network devices while the remainder of the trusted devices of the network continue to provide services over redundant links and newly defined and substituted security domains while denying connection requests from untrusted sources, as can be seen from a comparison of FIGS. 2 and 3. Thus, protection from attacks by authorized users and against hijacked sessions, not previously available, can be provided as well as protection from attacks from other sources and of other types.

These communications and routing control can be carried out very rapidly (about twenty milliseconds per tier or less) and thus an active response to a potential attack can be made in substantially real time and can be scaled to global size networks in log time. For example and as will be discussed in more detail below in connection with FIG. 4, communications and control can be exercised over six tiers (or thirty-two nodes) in about 0.1 seconds and over eleven tiers (2048 nodes) in about 0.2 seconds. Therefore, global communications and active response to any number of attacks can be performed over even extremely large networks with interruptions, if any, sufficiently short as to be unnoticeable by a user. This is in sharp contrast to security arrangements in prior networks which typically could only log operations during an attack for later analysis long after the attack and damage resulting therefrom are completed.

By the same token, temporary disconnection of network segments or sectors to test for the origin and scope of an attack or to interrupt an attack may be made correspondingly short. Since the duration of any such disruption can be so short and the disruption thus minimized, very sensitive detection algorithms having relatively low initial confidence levels (but very rapid response) are tolerable for detection of potential attacks and to achieve a very high level of security. This capability provided by the present invention is particularly important is avoiding the effects of denial of service attacks which, by their nature, are difficult to distinguish from ordinary usage except by volume and possibly some similarity of transactions before such attacks are well under way and may have captured a significant portion of available resources.

Thus, an attack, to be successful, would require simultaneous attacks on virtually all nodes of the system, all nodes of the hierarchically highest tier of the system or an attack on the hierarchically highest node (if such a singular node is permitted in the network design; which is preferably avoided but should, in any case, be difficult to identify within the network since the relationships and dependencies in the network are identified only in the highly secure user-transparent communications between SPM cards which are preferably made difficult to intercept and analyze through high bit rate, low duty cycle transmissions and effective encryption). Such an attack would also need to be carried out simultaneously, if not synchronously, at both the communicating, network connected processor level and at the SPM processor level of at least a plurality of processors since the manager and managed objects of the SPM processors are effectively self-repairing by virtue of the CORBA extensions for fault tolerance alluded to above.

It should be understood that the above discussion of compartmentalizing a portion of the network to isolate the location of a fault or an attack is merely exemplary of many types of active responses to such a fault or attack of which the invention makes the network capable through integration of the extended CORBA architecture which supports fault tolerance, strong encryption with user transparent communications which are difficult to intercept or simulate, implementation of attack detection at a lower level of certainty/higher level of sensitivity and speed for log time response and a fully flexible security policy capability.

Figure 4:
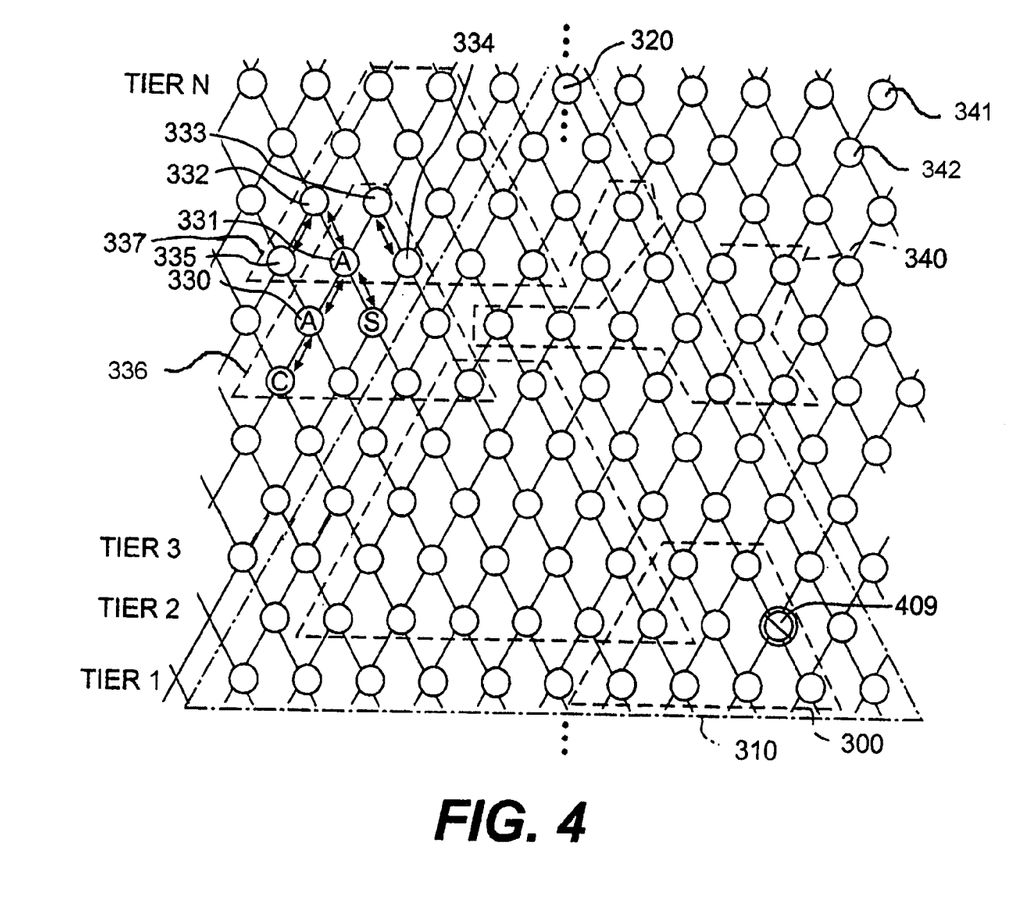
FIG. 4 illustrates an exemplary global search technique for potentially compromised nodes of a network.

Referring now to FIG. 4, further exemplary capabilities of the invention will now be discussed. It should be understood that FIG. 4 is intended to depict an expansion of FIG. 3 to a larger segment of a network system. That is, for reference, the segment of the network system depicted in FIG. 3 is indicated by dashed line 300 in FIG. 4 but could correspond to a similar group of nine contiguous nodes at any location in FIG. 4 or the remainder of the network of FIG. 4 beyond the nodes actually depicted. It is also to be understood that the functions depicted by other dashed lines in the expanded FIG. 4 are concurrently available and may be executed simultaneously in accordance with the invention since the SPM devices/cards can operate autonomously and yet cooperate in many functions by virtue of the CORBA extensions engendering fault tolerance which are leveraged by the invention to provide enhanced security and an active response to attacks in log time.

It should also be understood that while the depiction of the network of FIG. 4 is of planar topology insofar as the nodes which are depicted and a hierarchy of tiers is provided, only a locally hierarchical relationship between nodes is required and then only to the extent of ensuring an orderly relationship between manager objects and managed objects at different but connected nodes. Further, if it is desired to have a single node (which, if provided, is as frilly secured as possible) for exercise of ultimate network security control and supervision at a higher hierarchical level than any other node, as alluded to above, the organization of the network system could be may triangular or pyramidal as depicted by chain line 310.

In this regard, it should be appreciated that if the tiered hierarchy is maintained globally throughout the network, either in a planar or pyramidal organization, managed objects are only required for tiers 1 through N-1 and manager objects are only required for tiers 2 through N. It is also desirable that the manager objects in any tier be able to communicate with each other for various purposes (and, preferably and advantageously, through a hierarchically higher tier), examples of which will be discussed below. However, in a pyramidal arrangement where node 320 is of a higher hierarchical rank than any other node, such intra-tier communications will not be necessary (or possible) but other supervisory functions, the natures of which are unimportant to the successful practice of the invention and appropriate functions will, in any event, be evident to those skilled in the art, may be desirable in the manager objects of node 320.

As described above with reference to FIG. 3, the isolation and encapsulation of node 409 is exemplary of perhaps the most elementary of active responses provided by the invention. It should be appreciated that the provision of the capability of any active response is a substantial advance over known security systems which typically merely log the fact of an attack or the portion of the operations carried out during the attack (while the node remains operational) for later analysis by trained security personnel in order to determine the scope of damage and/or access which may have occurred. However, the invention provides and supports a wide variety of active responses in substantially real time (log time) to environmental changes and security related events, illustrative examples of which will now be described. Again, all of these functions can be performed simultaneously and in log time.

The ability to create layered security domains (by which management communications traffic is separated user data traffic and is maintained transparent to users) is fully generalized in accordance with the principles of the invention at both the node or terminal processor (e.g. 119 of FIG. 1) and the SPM processor. Since the managed and manager objects in the SPM processors are substantially and rapidly self-repairing, as discussed above, through the CORBA extensions for fault tolerance, any node can reach the SPM processor over a security domain which is not under simultaneous attack and which is beyond the security domains involved in a particular network communication between a client and server.

For example, in links between client C and Server S and a potential attack A is detected at node 330, the scenarios discussed above in regard to FIG. 3 would normally dictate that the security threat would be handled by the SPM device at node 331. Additionally, node 331 could communicate with other SPM devices in the same tier (e.g. at nodes 334 and 335) to revise the definition of the trusted and untrusted nodes, terminals and the like in the network environment and test downwardly through the tiers to determine the scope of the attack and the nature and timing of the response to be made. Thus, supervisory evaluation, judgement and control is exercised by a node which is not included in the secure sessions involved in any particular communication or attack but which is exercised through communications through other secure domains used by the user-transparent signals which are, themselves, highly secure.

If, however, node 331 was simultaneously attacked (A'), the user transparent signals (depicted by dashed double arrows) would be communicated to a node 332 and/or 333 of the next higher tier, and so on, and diagnositics (e.g. as described in regard to nodes 334 and 335) and control manager objects run at other nodes of the tier at which a trusted node is found.

Thus, control and diagnostics can always be found unless simultaneous attacks are made on all nodes of at least three tiers of the network, while the organization of the tiers and connectivity of the nodes is hidden by user transparent and secure communications between the SPMs which also have the capability to detect "foreign" SPMs or connections since each link between SPMs is a secure domain. By the same token, any node or group of nodes can be rapidly isolated and the attack or fault compartmentalized very quickly in log time since communication, fault evaluation and control can be communicated through the user transparent signals between SPMs in about 20 milliseconds per tier or less. Known search techniques (e.g. binary trees) can propagate search and control to encapsulate any attack to affected nodes in very short log time even for extremely large and even global networks.

It should also be appreciated that the isolation provided in accordance with the invention allows the offending or questionable communications to be pushed back by interrupting communications not only with the connected nodes of the network depicted in FIG. 4 but from other networks and/or connections to any particular node thereof. Thus the invention provides detection of questionable activities at every node, automatically collecting information related to any potential attack, isolation of the offending object with arbitrary flexibility of response (e.g. flexibly determining the level of certainty of an attack for initiation of a response in accordance with the number of nodes to be partitioned that is determined by the collected data concerning the potential attack), changing trust relationships between security domains, limiting the attack and even launching offensive information warfare capabilities (e.g. outbound from the compromised node while limiting or eliminating inbound communications). Such protection is available and can be provided simultaneously over other groups of nodes of arbitrary extent and which can overlap, as illustrated at 336 and 337.

Additionally, the ability to define security domains and secure sessions (and trust levels thereof) can be used not only to compartmentalize and isolate faults but can establish virtual private networks (VPNs) somewhat similar to the third layer of protection provided by physically isolated systems described above except that the connectivity is user or administrator defined and may be altered at will to include resources at desired nodes, as depicted at 340, while locking out all communications from other potential links. VPNs can be based, for example, on existing hardware and software products that implement to IPSec protocol suite and invoked by the user transparent communications and the above-described CORBA extensions.

The above-described security functions are fully available within the virtual private network including the ability to detect the connection of a "foreign" node communication in any security domain in the VPN, as described above, if included in the managed objects of included nodes, as would generally be the case. Of course, communications through some nodes not necessarily included in the VPN (e.g. nodes 341, 342) may be necessary but such communications do not lessen security of the VPN since connection is made through locked routers. Redundant connections are provided and supervision is conducted in the manner described above at yet additional nodes in other layers; providing plural layers of protection around the VPN. Thus a VPN provided in accordance with the principles of the invention is significantly more secure than a physically isolated network since protection is provided against session hijacking and attacks by authorized users.

It should be appreciated that the invention can develop defined VPNs in log time since the mechanism for defining the security domains is substantially the same as for compartmentalization and isolation but for the origin (e.g. with a user or administrator) of the VPN definitions. A useful application is to provide security for critical resources through the security policy manager during normal network operation and to switch to VPNs if an attack is detected in the network or critical segments thereof. This switching to VPNs would have the effect of terminating service to users having authorization for less than all of the resources of nodes in the VPN and effectively increase protection against attacks by authorized users.

In view of the foregoing, it is seen that the invention provides a capability of dynamic active response in log time to detected security events and fault conditions while allowing tailoring of responses in a manner commensurate with risk and system disturbance required to fully and effectively address any attack. The response may be offensive, defensive or both and the actions; taken may be flexibly defined and timed since the function of the invention to detect attacks and initiate active responses is entirely independent of the conditions detected and the nature of the responses. This active response capability is integrated with and leveraged by all components of the architecture of the invention as implemented within an arbitrary network and with arbitrarily fine granularity.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of operating a digital communication network having a plurality of nodes which have a locally hierarchical relationship, comprising the steps of:
   supplying identification information at a first node to a transmission received from the network even if a sender of the transmission is not identified;
   tracking network transmissions at the first node using the identification information and logging the identification information and a characteristic of the network transmission as traffic log information;
   communicating the traffic log information to another node;
   detecting a condition at the first node and communicating the condition to a trusted second node locally higher in said hierarchical relationship;
   disconnecting one or more nodes in the network to test for the origin and scope of a potential attack and reconnecting disconnected nodes not associated with the potential attack;
   collecting information regarding said condition and said traffic log through nodes at the same or higher hierarchical level as said trusted second node; and
   controlling a response at said first node in response to said information, wherein the controlling step includes switching a critical segment of the network to a secure mode when a threat is detected, and wherein the hierarchical relationship of the plurality of nodes is hidden to users of the network.

2. A method as recited in claim 1, wherein said communicating of the traffic log and the condition is performed over said digital communication network separately from user data communications.

3. A method as recited in claim 2, wherein said communicating and said controlling step are performed preferentially to said user data communications.

4. A method as recited in claim 1, wherein said communicating and said controlling step are performed by user transparent communications over said digital network.

5. A method as recited in claim 1, wherein said communicating and said controlling step are performed at bit rates of at least 10 Gbps.

6. A method as recited in claim 1, wherein said controlling step establishes a virtual private network.

7. A method as recited in claim 1, wherein said controlling step implements at least one of a mandatory access control policy and a discretionary access control policy.

8. A method as recited in claim 1, wherein said communicating establishes a trust level for a node of said digital network.

9. A method as recited in claim 1, wherein said communicating establishes a secure session between contiguous nodes of said digital network.

10. A method as recited in claim 1, including the further step of detecting a foreign security policy manager connection.

11. A computer readable medium upon which is embodied a sequence of programmable instructions which, when executed by a processor, cause the processor to perform operations comprising:
   detecting a condition at the first node and communicating the condition to a trusted second node locally higher in said hierarchical relationship;
   disconnecting one or more nodes in the network to test for the origin and scope of a potential attack and reconnecting disconnected nodes not associated with the potential attack;
   collecting information regarding said condition through nodes at the same or higher hierarchical level as said trusted second node; and
   controlling a response at said first node in response to said information.

12. The computer program of claim 11, wherein the controlling step includes switching a critical segment of the network to a secure mode when a threat is detected.

13. The computer program of claim 12, wherein the secure mode is a virtual private network.

14. The computer program of claim 11, wherein the predetermined operations include the steps of:

supplying identification information at a first node to a transmission received from the network even if a sender of the transmission is not identified;

tracking network transmissions at the first node using the identification information and logging the identification information and a characteristic of the network transmission as traffic log information; and communicating the traffic log information to another node.

15. The computer program of claim 11, wherein the hierarchical relationship of the plurality of nodes is hidden to users of the network.

16. A method of actively compartmentalizing a network in real time using manager objects and managed objects arranged in a locally hierarchically relationship, said method comprising:

providing a plurality of nodes, each node having at least one manager object and one or more managed objects, wherein each manager object corresponds to one or more managed objects and each managed object corresponds to a network connection to another node;

adding identification information to a transmission received at a first node from the network even if a sender of the transmission is not identified;

tracking network transmissions at the first node using the identification information and logging the identification information and a characteristic of the network transmission as traffic log information;

communicating the traffic log information to another node in a form that is transparent to users of the network;

detecting a condition at the first node and communicating the condition, in a form that is transparent to users of the network, to a trusted second node locally higher in said hierarchical relationship;

collecting information regarding said condition and said traffic log through nodes at the same or higher hierarchical level as said trusted second node;

controlling a response at said first node in response to said information; and disconnecting one or more nodes in the network to test for the origin and scope of a potential attack and reconnecting disconnected nodes not associated with the potential attack.

17. The method of claim 16, wherein the controlling step includes switching a critical segment of the network to a secure mode when a threat is detected.

18. The method of claim 17, wherein the secure mode is a virtual private network.

19. The method of claim 16, wherein the locally hierarchically relationship of manager nodes and managed nodes is hidden to users of the network.

* * * * *